United States Patent [19]

Ernst et al.

[11] Patent Number: 4,513,112
[45] Date of Patent: Apr. 23, 1985

[54] HIGH BUILD, AMBIENT CURE COATING COMPOSITIONS

[75] Inventors: Bruce H. Ernst, Edinboro; Dennis D. Howard, Girard; Thomas E. Gismondi, Erie, all of Pa.

[73] Assignee: Lord Corporation, Erie, Pa.

[21] Appl. No.: 587,032

[22] Filed: Mar. 7, 1984

[51] Int. Cl.$^3$ .................................................. C08K 3/36
[52] U.S. Cl. ...................................... 524/590; 524/493; 524/871; 524/872; 524/873; 524/874; 524/875; 524/906; 524/847
[58] Field of Search ............... 524/871, 872, 873, 874, 524/875, 847, 493, 590, 906

[56] References Cited

U.S. PATENT DOCUMENTS

| | | |
|---|---|---|
| 3,420,800 | 1/1969 | Haggis . |
| 3,607,822 | 9/1971 | Nishino ............................. 524/875 |
| 3,919,173 | 11/1975 | Coyner et al. ..................... 528/76 |
| 3,923,926 | 12/1975 | Harada et al. ..................... 528/78 |
| 4,038,239 | 7/1977 | Coyner et al. ..................... 528/58 |

FOREIGN PATENT DOCUMENTS 51-58498  5/1976  Japan ................................ 524/871

*Primary Examiner*—Lewis T. Jacobs
*Attorney, Agent, or Firm*—John A. Gazewood

[57] ABSTRACT

The use of isocyanate-functional prepolymers containing from recurring poly(ethylene oxide) units and colloidal silica in two-pack polyurethane compositions not only increases the flexibility of high build coatings prepared from such compositions but is also effective in controlling the mixed viscosity.

4 Claims, No Drawings

HIGH BUILD, AMBIENT CURE COATING COMPOSITIONS

The present invention relates to polyurethane coating compositions. More particularly, the invention relates to ambient temperature curing two-package polyurethane coating compositions which can be employed to deposit high build films which are tough, flexible and resistant to erosion, abrasion and impact.

Two-pack polyurethane coating compositions are well known. Typically, such compositions comprise a first pack containing at least one monomeric or polymeric polyisocyanate compound and a second pack containing at least one monomeric or polymeric compound containing at least two active hydrogen atoms which are reactive with free isocyanate groups; with the two packs being mixed together at the time of use. The cured films exhibit excellent properties when applied as thin films of 3 mils (dry) or less when applied to horizontal surfaces, but tend to sag, run and drape when applied to non-horizontal surfaces. To obtain thick films of 10 mils (dry) or more in those industrial applications where such high build films are desired requires that a plurality of coats be applied, which not only increases costs but also introduces other at least potentially undesirable problems, such as solvent popping and poor intercoat adhesion. The addition of thickeners such as fillers, powders and the like to one or both packs so that, when mixed, the polyurethane composition will have sufficient viscosity to resist sagging, running and draping and to reduce the number of coats required for high build causes problems in handling the compositions. For example, the viscosity of the packs can be sufficiently different that proper mixing of the two packs in conventional application equipment cannot be readily accomplished, and the mixed viscosity can be too high for certain methods of application such as by spraying. In addition, the inclusion of such thickeners can have a deleterious effect on cured film properties.

The present invention provides two-pack polyurethane compositions which, when mixed, are effective to provide high build films having a dry film thickness of at least 10 mils with minimal sagging, running or draping. The high build coatings of the invention can be applied by any conventional method, including spraying. In addition, the high build coatings of the invention have an improved flexibility which enables them to readily conform to irregularly-shaped substrates, including those having angular projections greater than 0° and less than 180°. The compositions of the invention are curable at ambient temperatures to provide high build films which are tough, flexible and resistant to erosion, abrasion and impact.

Like the known two-pack polyurethane compositions, the compositions of the invention comprise at least one monomeric or polymeric compound having at least two reactive isocyanate groups and at least one monomeric or polymeric compound having at least two active hydrogen atoms which are reactive with free isocyanate groups. The compositions of the invention differ from known two-pack compositions in that they must contain at least one compound having at least two free isocyanate groups and at least two repeating ethylene oxide units having the structure $-(CH_2CH_2O)_{\overline{n}}$ wherein n is at least 2, in an amount which is sufficient to provide a polyethylene oxide (PEO) content in the range from 0.5 to 40, preferably 0.5 to 20, weight percent, based on the total weight of isocyanate-functional compounds. In addition, the compositions of the invention must also contain from 0.5 to 10, preferably 0.5 to 4, percent by weight of colloidal silica, the amount of silica being based on the total weight of the ethylene oxide-containing compound. While the silica can be incorporated into either pack, it is preferentially incorporated into the pack containing the isocyanate-functional ethylene oxide-containing compound. The use of the isocyanate-functional ethylene oxide-containing compound in combination with colloidal silica provides an unexpected control of the mixed viscosity which enables the mixed composition to be applied readily by any conventional means, including spraying and results in a more flexible film without adversely affecting other films properties.

The concept of the invention envisions several embodiments.

In a first embodiment, there is envisioned a first pack comprising at least one isocyanate-functional prepolymer containing from 0.5 to 40 percent by weight, based on total weight of such prepolymer of ethylene oxide units having the structure $-O-(CH_2CH_2O)_{\overline{n}}$ wherein n is at least 2 and from 0.5 to 10 weight percent, based on such prepolymer of colloidal silica; and a second pack comprising at least one curing agent for said isocyanate-functional prepolymer, said curing agent comprising a monomeric or polymeric compound having at least two active hydrogen atoms which are reactive with free isocyanate groups.

In a second embodiment, there is envisioned a first pack comprising an admixture of at least one isocyanate-functional prepolymer characterized by the substantial absence of ethylene oxide units and at least one isocyanate-functional prepolymer having at least two ethylene oxide units as previously defined, the amount of such ethylene oxide units being sufficient to provide an polyethylene oxide content in the range from 0.5 to 40 percent by weight, based upon total weight of combined isocyanate-functional prepolymer, and from 0.5 to 10 weight percent of colloidal silica, based on total weight of ethylene-oxide-containing prepolymer; and a second pack comprising at least one curing agent for said isocyanate-functional prepolymers, said curing agent comprising a monomeric or polymeric compound having at least two active hydrogen atoms which are reactive with free isocyanate groups.

In another embodiment, there is envisioned a first pack comprising at least one isocyanate-functional prepolymer which contains ethylene oxide units as previously described; and a second pack comprising at least one curing agent for said prepolymer, at least one of said curing agents also containing ethylene oxide units as previously described. In this embodiment, the total ethylene oxide content of both packs is in the range from 0.5 to 40 percent by weight, based on total weight of isocyanate-functional prepolymer and can be allocated to either pack at the discretion of the formulation. This embodiment also contains colloidal silica in an amount in the range from 0.5 to 10 percent by weight, based on total weight of isocyanate-functional prepolymer. The silica may be included in either pack, but is preferably incorporated into both packs in amounts corresponding to the ethylene oxide content percentage of each pack.

Still another embodiment envisages a first pack comprising at least one isocyanate-functional prepolymer which contains no ethylene oxide units in admixture with at least one isocyanate-functional prepolymer which does contain ethylene oxide units; and a second pack comprising at least one curing agent for said isocyanate-functional prepolymers, at least one of such curing agents containing ethylene oxide units as previously described. As in the immediately preceding embodiment, in this embodiment the total ethylene oxide content of both packs is in the range from 0.5 to 40 percent by weight, based on total weight of the admixture of isocyanate-functional prepolymers, and can be allocated to the two packs at the discretion of the formulator. Likewise, this embodiment also contains colloidal silica in an amount in the range from 0.5 to 10 percent by weight, based on total weight of the admixture of isocyanate-functional prepolymers; and may be incorporated into either pack, but is preferably incorporated into both packs in amounts corresponding to the ethylene oxide content percentage of each pack.

In the last three recited embodiments, it should be apparent that the term "curing agents" contemplates one or more curing agents which contain ethylene oxide units as described, and mixtures of such curing agents with curing agents which do not contain such ethylene oxide units, as well as curing agents which do not contain ethylene oxide units.

Substantially any linear or branched monomeric compound containing two or more reactive isocyanate groups can be employed in the compositions of the invention. These monomeric polyisocyanates can be employed alone or in admixture with isocyanate-functional polymeric materials in one of the two packs. They are also precursor materials, which, when reacted with an appropriate active hydrogen atom-containing material, can be employed to make isocyanate-functional polymeric materials, which can contain ethylene oxide units, or active hydrogen-functional polymeric materials, which also contain ethylene oxide units, which can function as curing agents for compounds containing free isocyanate groups. Representative monomeric polyisocyanates include, without being limited to these compounds, toluene diisocyanate, 4,4''-diphenyl diisocyanate, 4,4'-diphenyl-methane diisocyanate, 4,4'-diphenyl ether diisocyanate, dianisidine diisocyanate, 1,5-naphthalene diisocyanate, p-phenylene diisocyanate, trimethylene diisocyanate, octadecylmethylene diisocyanate, 2-chloropropane diisocyanate, 4,4'-methylene-bis(phenyl isocyanate), isophorone diisocyanate, 4,4'-methylene-bis(cyclohexyl isocyanate), 4,4'4''-triphenyl-methane triisocyanate, 1,3,5-benzene triisocyanate, polymethylene poly(phenyl isocyanate), and the adduct of one mol of trimethylolpropane with three mols of 4,4'-methylene-bis(cyclohexyl isocyanate).

As is well known in the art, isocyanate-functional polymeric materials are typically prepared by conventional one-stage and two-stage processed by contacting an excess of one or more polyisocyanate compounds having at least two free isocyanate groups with monomeric or polymeric compounds containing at least two active hydrogen atoms which are reactive with free isocyanate groups. The literature is replete with listings of suitable active hydrogen atom-containing compounds, including water, mercaptans, primary and second amines, acids and hydroxyl-containing compounds with the latter being currently preferred. Representative active hydrogen atom-containing compounds include water, ethylene glycol, diethylene glycol, 1,3-propylene glycol, 1,4-butane diol, ethanol amine, ethylene diamine, hexamethylene diamine, N-methyl-diethanol amine, N-cyclohexyl diisopropyl amine, N,N-dihydroxyethyl-p-toluidine, N,N-dihydroxypropyl-naphthyl amine, oxalic acid, malonic acid, succinic acid, adipic acid, sebacic acid, maleic acid, fumaric acid, 6-aminocaproic acid, p-aminobenzoic acid, glycerol, trimethylolpropane, erythritol, pentaerythritol, polyethers such as poly(ethylene oxide)diol, poly(ethylene oxide/propylene oxide) diol, poly(propylene oxide) diol and poly(tetramethylene oxide) diol, polylactones such as polycaprolactone, polycarbonates, polyacetate, polythioethers and polyhydroxypolyesters of polycarboxylic acids such as succinic acid, adipic acid, suberic acid, azelaic acid, sebacic acid, phthalic acid, isophthalic acid and terephthalic acid with polyols such as ethylene glycol, diethylene glycol, 1,4-butane diol, trimethylopropane, glycerol, erythritol, pentacrythritol, poly(ethylene oxide) diol, poly(ethylene oxide/propylene oxide) diol and poly(tetramethylene oxide) diol.

The ethylene oxide-containing isocyanate-functional prepolymers which are an essential feature of this invention are prepared by the well known one stage or, preferably, by the equally well known two-stage or prepolymer process by reacting an excess of at least one compound having at least two free isocyanate groups and at least one compound having at least two active hydrogen atoms which are reactive with free isocyanate groups and which also contains recurring ethylene oxide units having the structure $-(CH_2CH_2O)_n-$ where n is at least two, and preferably is in the range from 4 to 150. Representative compounds which contain ethylene oxide units in their structure include diethylene glycol, poly(ethylene oxide) diol, poly(ethylene oxide/propylene oxide) diol, and polyesters obtained by reacting such compounds with one or more polycarboxylic acids or acid anhydrides. Other ethylene oxide-containing compounds which can be reacted with polyisocyanates to form isocyanate-functional ethylene oxide-containing prepolymers for use in the practice of this invention can be obtained following well known procedures involving condensation or catalytic polymerization of ethylene oxide or its ethoxylated derivatives. Thus, ethylene oxide and its ethoxylated derivatives can be reacted with water and monomeric and polymeric organic compounds having at least two labile hydrogen atoms, especially compounds having hydroxyl, carboxyl, mercapto, isocyanato and amino or other nitrogen-containing groups to obtain monomeric and polymeric ethylene oxide-containing compounds having two or more active hydrogen atoms which are reactive with free isocyanate groups.

As noted, the isocyanate-functional prepolymers which are employed in the practice of this invention can be prepared by any of the known methods of polyurethane chemistry, either by the one-stage process or, preferably, by the two-stage or prepolymer process. Both one-stage and two-stage methods of preparing isocyanate-functional polymeric materials may be carried out in the melt or in solution, that is, in the absence or presence of organic solvents which are inert with respect to isocyanate groups. Suitable solvents include methyl formate, ethyl formate, amyl formate, methyl acetate, ethyl acetate, amyl acetate, acetone, methyl ethyl ketone, diethyl ketone, cellosolve acetate, cellosolve butyrate, cellosolve acetate butyrate, benzene, toluene, petroleum naphthas, methylene chloride, dimethylformamide and dioxane. When used, the inert solvents are employed in an amount to provide a solution of isocyanate-functional prepolymer in a concentration in the range from 5 to 75, preferably 5 to 55, percent by weight, expressed as resin solids.

In preparing the preferred isocyanate-functional prepolymers by the one-stage method, the reactants, including at least one polyisocyanate having at least two isocyanate groups, at least one organic compound having at least two active hydrogen atoms and which preferably has a molecular weight in the range from 200 to 7500 and, optionally, at least one chain-extending organic compound having at least two active hydrogen atoms and which preferably has a molecular weight below 300, are mixed together and reacted simultaneously, employing an isocyanate:total active hydrogen atoms ratio which is preferably in the range from 1.0:1 to 5:1, preferably 1.1:1 to 3.1. The reaction is generally completed in a few hours at reaction temperatures on the order of 50° C., and is facilitated by the use of basic reaction catalysts such as dibutyltin dilaurate. Hydrophilic ethylene oxide centers are readily introduced into isocyanate-functional prepolymers by the use of active hydrogen atom-containing compounds which contain ethylene oxide units in their structure, such as diethylene glycol, poly(ethylene oxide) diol, poly (ethylene oxide-propylene oxide) diol copolymer and polyesters obtained by reacting such compounds with one or more polycarboxylic acids or acid anhydrides. The use of difunctional reactants typically provides linear prepolymers and the use of either or both isocyanate compounds and active hydrogen atom-containing compounds having at least three reactive groups typically provides branched prepolymers.

In the two-stage process, which is generally preferred, an isocyanate-functional prepolymer is first prepared by reacting excess polyisocyanate with the higher molecular weight active hydrogen atom-containing compounds as described above, preferably at an isocyanate: active hydrogen ratio in the range from 1.05:1 to 5:1, especially 1.1:1 to 2.5:1, using either a solvent-free melt of the reactants or using organic soluents which are inert to isocyanate groups. The resulting prepolymer is then reacted with the lower molecular weight chain-extending organic compound mentioned above, employing an excess amount of prepolymer. Reaction conditions are substantially the same as for one stage processes. Hydrophilic ethylene oxide centers are introduced into isocyanate-functional prepolymers prepared by the two-stage process in the same manner employed in one-stage processes, that is, by the use of active hydrogen atom-containing compounds which contain ethylene oxide units in their structure. Linear products result from the use of difunctional reactants, while branched products result from the use of at least one reactant having three or more reactive groups.

The colloidal silica which is an essential component of the invention is preferably hydrophilic, has a particle size in the range from 0.2 to 1000 microns and a surface area of 50 to 1200 square meters per gram. The silica is typically approximately 99.8 percent silicon dioxide by weight (as a moisture free basis) and exists in three dimensional chain aggregates with a surface which is hydrophilic and capable of hydrogen bonding. The colloidal silica will be used in an amount in the range from 0.1 to 10, preferably 0.5 to 4, percent by weight, based on total weight of ethylene oxide-containing materials.

The curing aspects for the isocyanate-functional monomeric and polymeric compounds of the first pack comprise at least one compound having at least two active hydrogen atoms which are reactive at ambient temperatures with free isocyanate groups. Suitable active hydrogen atom-containing compounds include water in its various liquid or vaporized forms and organic monomeric and polymeric compounds which are substantially free of ethylene oxide units, as well as such organic compounds which do contain ethylene oxide units in their molecule. Preferred active hydrogen atom-containing compounds are those having hydroxy, carboxyl, mercapto, and amino or other nitrogen-containing groups, including combinations of such groups, such as amino-hydroxy. As is well known, monomeric or polymeric compounds which are reactive with isocyanate-containing compounds to form isocyanate-terminated, active hydrogen atom-terminated and thermoplastic polyurethanes can be employed as curatives for isocyanate-functional compositions. As used in this application, the term "polyurethane" is used to describe the reaction product of an isocyanate-functional compound and an active hydrogen atom-containing compound, even though a particular reaction does not contain urethane groups.

Particularly preferred as curing agents in the compositions of this invention are aliphatic and aromatic aldimines and ketimines comprising the reaction product of aliphatic and aromatic polyamines and volatile ketones and aldehydes, with aromatic ketimines being currently preferred. The aldimines and ketimines are prepared by well known by methods, for example, by heating the reactants in an organic solvent with removal of water as it is formed. While the reaction can take place in an inert organic solvent, it is preferred to contact the amine reactant with a substantial excess of the ketone or aldehyde reactant, with ratios of 5 to 10 moles of ketone or aldehyde per mole of amine being currently preferred. The amine-containing compound can be monomeric or polymeric, can contain two or more amine groups, and is preferably a monomeric diamine.

Polyamines which can be employed in forming imine curing agents include ethylene diamine, hexamethylene diamine, diamino cyclohexane, m- and p-xylenediamines, m-phenylene diamine, p-phenylene diamine, toluene diamine, diamino diphenyl methanes, diethplene triamine, triethylene glycol diamine, polymers of alkylene oxide, such as poly (ethylene oxide) in which the terminol hydroxyl groups have been replaced by amino groups and dimethyl-1,4-diaminoadipate. A currently preferred amine is m-phenylene diamine.

Ketones and aldehydes which can be employed in forming imine curing agents include methyl isobutyl ketone, diethyl ketone, methyl ethyl ketone, methyl propyl ketone, methyl n-amyl ketone, diisobutyl ketone, cyclo hexanone, acetophenone, methyl t-butyl ketone, acetaldehyde, n-butyraldehyde, isobutyraldehyde, isopentaldehyde, 2-ethylhexaldehyde, acrolem dimer, benzaldehyde and acetone. Ketones, especially aliphatic ketones, are currently preferred.

When the two packs are mixed, the reaction between the isocyanate-functional materials and the curing agents can occur non-catalytically. If desired, known urethanation catalysts can be incorporated into the pack containing the curing agent. Such catalysts include tertiary amines and organometallic salts, such as N-methylmorpholine, triethylenediamine, N,N-dimethylethanolamine, dibutyl tin dilaurate, phenylmercuricpropionate and stannous octoate. The selection of and the amound of catalyst employed is not critical to the invention and is well within the skill of the ordinary person in this area.

The proportions of curing agent to isocyanate-functional compounds are not overly critical. Typically, the curing agent is provided in an amount which will provide from 0.6 to 1.2, preferably 0.6 to 0.95 equivalents of active hydrogen compound per equivalent of isocyanate-functional compound. Upon mixing, the ingredients exhibit a satisfactory pot life, with mixtures containing the imine curing agents having a pot life from two to four hours. One advantage of the imine curing agents is the inertness towards the isocyanate radical in the absence of water. The presence of water, in whatever liquid or vaporized form, causes the mine to dissociate and regernates the free polyamine. One disadvantage of the imines is their extremely low viscosity. The resulting viscosity of polyurethane compositions into which they are mixed is often too low for proper application, on the one hand, or to obtain high film builds without applying a plurality of thin coats. The present invention overcomes the viscosity problem. The combination of colloidal silica and the isocyanate-functional ethylene oxide-containing prepolymer provides high build films through the use of lesser amounts of silica than is usually required and, even though the viscosity of the isocyanate-functional compound-containing pack is thus significantly less, the resulting viscosity following mixing of both packs is significantly higher than would be expected, especially when the second pack comprises highly diluted imine.

The two-pack polyurethane compositions of the invention are prepared by combining the individual ingredients if each package by conventional methods. At the time of use, the package containing the curative is admixed into the pack or package containing the isocyanate-functional polyethylene oxide-containing prepolymer. The resulting mixed coating composition can be applied by conventional methods, including roller coating, spray coating or brushing. A particularly preferred technique for applying the coating compositions is by spray coating.

EXAMPLE I

Preparation of Ketimine 54.07 grams (0.5 mol) of p-phenylene diamine is combined with 570.95 grams (5.0 mols) of methyl-n-amyl ketone. Note that the ketone is provided in a 10:1 ratio—i.e., a nine-fold excess. 0.08 grams benzoic acid (0.004 mols) is added to the mixture as a catalyst. All of the ingredients are placed in a reactor and heated rapidly to reflux. The heating continues in a nitrogen environment to maintain reflux. The pot temperature is maintained between 147 and 155 degrees C. The reaction product is a dilute anhydrous solution of the ketimine in excess methyl-n-amyl ketone. The reaction product is collected and stored under dry nitrogen.

EXAMPLE II

Preparation of Organic Polyisocyanate Prepolymers

A. First polyisocyanate prepolymer—3,932 grams of polytetramethylene oxide having a molecular weight of 1,000 is combined with an 80/20 isomeric mixture of 2,4- and 2,6-toluene diisocyanate. The mixture is heated at 80 degrees for two hours in a closed flask under nitrogen atmosphere. The resulting polyisocyanate prepolymer has an NCO value of 4.8 percent and zero weight percent polyethylene oxide.

B. Second polyisocyanate prepolymer—3,477.7 grams of a 1000 molecular weight co-polymer containing 40 weight percent poly(ethylene oxide) moieties and 60 weight percent propylene oxide moieties is combined with 1,022.3 grams of 2,4-toluene diisocyanate. The mixture is heated at 80 degrees C. for five and one-half hours in a closed flask with a nitrogen atmosphere. The resulting polyisocyanate prepolymer has an NCO value of 4.48 percent and an polyethylene oxide content of 30.9 weight percent.

C. Third polyisocyanate prepolymer—728.6 grams of tetramethylene oxide having a molecular weight of 2,000 is combined with 290.2 grams of a mixed alkylene oxide polyol containing 40 percent by weight ethylene oxide, 60 percent by weight propylene oxide and having a molecular weight of 2,000. This polyol mixture is combined with 145.3 grams of 2,4-toluene diisocyanate. The mixture is heated at 85 degrees C. The NCO value of the resulting polyisocyanate prepolymer is 2.4 percent. The prepolymer contains 10 weight percent polyethylene oxide.

It will be observed that Example 2-A is a polyisocyanate prepolymer obtained from reaction of an organic polyisocyanate with an organic polyol containing no PEO moieties. Example 2-B is a polyisocyanate prepolymer obtained by the reaction of an organic polyisocyanate with a polyol containing PEO moieties. Example 2-C is a polyisocyanate prepolymer obtained by reacting an organic polyisocyanate with a mixture of two different organic polyols, one of which contains PEO moieties and one of which does not contain PEO moieties.

EXAMPLE III

A polyisocyanate prepolymer composition is prepared by combining the following ingredients:

|  | PERCENT BY WEIGHT |
|---|---|
| Solvent-butyl acetate, ethyl benzene and ethylene glycol mono-butyl ether acetate | 29.1 |
| Wetting agent | 0.2 |
| Carbon black (pigment) | 1.7 |
| Polyisocyanate (polymeric MDI) (purpose of polyisocyanate is to remove residual water from carbon black) | 0.5 |
| Polyisocyanate prepolymer of Example 2-A | 12.1 |
| Polyisocyanate prepolymer of Example 2-B | 52.9 |
| Flow agent | 0.7 |
| Fumed silica | 10.8 |
| TOTAL | 100.0 |

The polyisocyanate prepolymer composition has a viscosity of 5,800 cps measured (24 hours after mixing of the ingredients) on a Brookfield LVT, No. 4 spindle at 60 rpm. The composition has a polyethylene oxide content of 16.35 weight percent.

EXAMPLE IV

A coating was prepared by combining 100 parts by weight of the polyisocyanate prepolymer composition of Example III with 34.5 parts by weight of the ketimine solution from Example I, i.e., containing the ketimine in methyl-n-amyl ketone solvent. The ketimine:NCO equivalent ratio was 0.85:1. The mixture was stirred in a paint can with a wooden paddle. The viscosity of the mixture immediately following mixing was 1,300 cps (Brookfield No. 4 spindle). The coating composition was applied by an airless spray gun to a steel test coupon having a Bonderite surface treatment with a butyral phosphoric acid wash primer. The coating spray was 80 mils thickness wet. The coating was air dried at room temperature. Within two hours the coating was tack free. Overnight the coating developed a full cure. The coating had a tensile strength of 6,000 psi, an elongation at break at 600 percent, excellent abrasion resistance, excellent adhesion. The coating after seven days ambient cure was placed in boiling water for 24 hours without any loss of tensile strength.

EXAMPLE V

A polyisocyanate prepolymer composition is prepared by combining the following ingredients:

| | PERCENT BY WEIGHT |
|---|---|
| Solvent blend (as described in Example 4) | 15.25 |
| Wetting agent | 0.25 |
| Carbon black (pigment) | 2.11 |
| Polymeric MDI (to soak up water from carbon black) | 0.59 |
| Flow Agent | 0.89 |
| Polyisocyanate prepolymer of Example 2-C | 79.68 |
| Fumed silica | 1.23 |
| TOTAL | 100.00 |

This polyisocyanate prepolymer composition had a viscosity 24 hours after mixing of 23,500 cps. The composition had an polyethylene oxide content of 8 weight percent.

One hundred parts by weight of the described polyisocyanate prepolymer composition was mixed with 27.1 parts by weight of the ketimine solution described in Example I. The ketimine: NCO equivalent ratio was 0.78:1. The resulting mixture had a viscosity immediately following mixing of 2,750 cps. The mixture was applied by airless spray as an 80 mils thick (wet) coating on a steel coupon as described in Example V. The coating exhibited excellent abrasion resistance and adhesion and resistance to boiling water.

EXAMPLE VI

A polyisocyanate prepolymer composition is prepared by combining the following ingredients:

| | PERCENT BY WEIGHT |
|---|---|
| Solvent blend described in Example V | 29.13 |
| Wetting Agent | 0.22 |
| Carbon black (pigment) | 1.72 |
| Polymeric MDI (to remove water from the carbon black) | 0.48 |
| Flow agent | 0.73 |
| Polyisocyanate prepolymer of Example 2-A | 32.48 |
| Polyisocyanate prepolymer of Example 2-C | 32.48 |
| Fumed silica | 2.76 |
| TOTAL | 100.00 |

The mixture had a viscosity 24 hours after mixing of 7,000 cps measured with a Brookfield viscosimeter, No. 4 spindle at 60 rpm. One hundred parts of the polyisocyanate prepolymer composition, which had an polyethylene oxide content of 13.3 weight percent, was mixed with 28.6 parts by weight of the ketimine solution described in Example I. The ketimine:NCO equivalent ratio was 0.88:1. The resulting mixture had a viscosity immediately following mixing of 2,850 cps.

The mixture was applied as a coating by airless spray on a steel coupon as described in Example IV. The coating was applied 80 mils wet thickness dry. The coating had a tensile strength of 6,000 psi, an elongation of 600 percent, excellent abrasion resistance, excellent adhesion. After seven days ambient cure, the coating was placed in boiling water for 24 hours without loss of tensile strength.

EXAMPLE VII

| First Pack: | | | | | | |
|---|---|---|---|---|---|---|
| Polyisocyanate prepolymer, Ex. II-A | 100 | 81.4 | 100 | 100 | 100 | 100 |
| Polyisocyanate prepolymer, Ex. II-B | | 18.6 | | | | |
| Polyethylene glycol | | | 0.5 | | | |
| Polyethylene glycol methyl ether | | | | 0.5 | 0.5 | 0.45 |
| Fumed silica | 10.5 | 3.5 | 10.5 | 10.5 | 5.0 | 0.9 |
| Solvent, Ex. IV in amount to provide 70 percent total solids content | | | | | | |
| Viscosity, cps | 39500 | 8000 | Very High | Very High | 11400 | 950 |
| Second Pack | | | | | | |
| Ketimine of Example I. | | | | | | |
| Mixed viscosity, cps | 600 | 2500 | N/A | N/A | 3150 | 350 |

Each of the first packs were mixed with the ketimine solution of Example I at a volumetric relationship of 3 parts first pack/part second pack. The ketimine:NCO equivalent ratio was 0.9:1. The viscosity of the first pack and the mixed viscosity of both packs is reported in the Table. The data clearly show the effect of fumed silica in combination with isocyanate-functional polyethylene oxide-containing prepolymers for viscosity control.

What is claimed is:

1. A high build, ambient temperature-curable coating composition comprising a homogeneous mixture of
    (a) at least one polymeric compound having at least two free isocyanate groups and containing from 0.5 to 40 percent by weight, based on total weight of such polymeric compound, of polyethylene oxide units having the structure $-(CH_2CH_2O)_{\overline{n}}$ where n is at least 2;
    (b) from 0.5 to 10 percent by weight, based on total weight of said isocyanate-functional ethylene oxide-containing polymeric compound, of colloidal silica; and
    (c) at least one curing agent for said isocyanate-functional polymeric compound, wherein said curing agent comprises at least one ketimine, said ketimine comprising the reaction product of at least one aromatic amine having at least two primary amine groups and at least one aliphatic ketone, where the amount of said ketimine is in the range from 0.6 to 1.2 equivalents of amine per equivalent of isocyanate.

2. A high-build, ambient temperature-curable coating composition comprising a homogeneous mixture of
    (a) at least one compound having at least two free isocyanate groups and being substantially devoid of polyethylene oxide repeating units having the structure $-(CH_2CH_2O)_{\overline{n}}$ wherein n is at least 2;
    (b) at least one polymeric compound having at least two free isocyanate groups and containing recurring polyethylene oxide units having the structure $-(CH_2CH_2O)_{\overline{n}}$ where n is at least 2, the amount of such isocyanate-functional, polyethylene oxide-containing polymeric compound being sufficient to provide a polyethylene oxide content in the range from 0.5 to 40 percent by weight, based on the total weight of isocyanate-functional compounds (a) and (b);

(c) from 0.5 to 10 percent by weight, based on total weight of isocyanate-functional, polyethylene oxide-containing polymeric compound (b), of colloidal silica; and (d) at least one curing agent for said isocyanate-functional compounds (a) and (b), wherein said curing agent comprises at least one ketimine, said ketimine comprising the reaction product of at least one aromatic amine having at least two primary amine groups and at least one aliphatic ketone, the amount of said ketimine being sufficient to provide from 0.6 to 1.2 equivalents of amine per equivalent of isocyanate.

3. A curable coating composition comprising at least two separate parts to be mixed at time of use comprising (a) at least one polymeric compound having at least two free isocyanate groups and containing from 0.5 to 40 percent by weight, based on the total weight of said polymeric compound, of polyethylene oxide units having the structure $-(CH_2CH_2O)_n-$ wherein n is at least 2; and from 0.5 to 10 percent by weight, based on the total weight of said isocyanate-functional, polyethylene oxide-containing polymeric compound, of colloidal silica as a first part; and (b) as a second part, at least one curing agent for said isocyanate-functional polymeric compound, wherein said curing agent comprises at least one ketimine, said ketimine comprising the reaction product of at least one aromatic amine having at least two primary amine groups and at least one aliphatic ketone, wherein the amount of said ketimine is in the range from 0.6 to 1.2 equivalents of amine per equivalent of isocyanate; said ketimine being reactive in the presence of moisture with the isocyanate-functional compound of said first part to produce a curable coating.

4. A curable coating composition according to claim 3 wherein said first part (a) contains at least one compound having at least two free isocyanate groups and being substantially devoid of polyethylene oxide repeating units having the structure $-(CH_2CH_2O)_n-$ wherein n is at least 2.

* * * * *